United States Patent [19]
Lin

[11] Patent Number: 5,897,197
[45] Date of Patent: Apr. 27, 1999

[54] DECORATIVE TANK

[75] Inventor: Chung-Kuei Lin, Kowloon, The Hong Kong Special Administrative Region of the People's Republic of China

[73] Assignee: Peaktop Limited, Kowloon, The Hong Kong Special Administrative Region of the People's Republic of China

[21] Appl. No.: 08/987,175

[22] Filed: Dec. 8, 1997

[51] Int. Cl.[6] .................................................. F21V 33/00
[52] U.S. Cl. .......................................... 362/101; 362/806
[58] Field of Search .................................... 362/101, 253, 362/806, 96; 119/267, 266

[56] References Cited

U.S. PATENT DOCUMENTS

| | | | |
|---|---|---|---|
| 3,292,579 | 12/1966 | Buchanan | 362/101 |
| 3,326,185 | 6/1967 | Perez | 362/101 |
| 4,591,955 | 5/1986 | Kallay | 362/101 |
| 5,211,469 | 5/1993 | Matthias et al. | 362/101 |

Primary Examiner—Thomas M. Sember

[57] ABSTRACT

A decorative tank includes a main body and an air-introducing means. The main body, which has a bed portion and a wall portion, defines a water reservoir therein. The wall portion of the main body has a substantially upright-sloping surface formed thereon. The wall portion defines a passage therein which extends substantially upwardly from a lower end to an upper end. The passage communicates with the bottom portion of the water reservoir at the lower end. The water reservoir contains a quantity of particles therein which have a specific weight greater than water. The wall portion of the main body has a window portion through which the view within said main body can be clearly seen from outside. The air-introducing means can introduce air to the lower end of the passage, so that the particles, such as sand, can be carried upwardly together with water by air to flow along the passage and to finally exit from the upper end of the passage, to allow the sand to fall along the substantially upright-sloping surface of the wall portion of the main body to give the appearance of a waterfall.

15 Claims, 6 Drawing Sheets

DECORATIVE TANK

BACKGROUND OF THE INVENTION

The present invention relates to a decorative tank, and more particularly to a decorative tank in which a waterfall is simulated by means of a sand flow. In particular, the decorative tank can be ornamented with artificial contents such as rocks, pet tropical fishes or aquatic plants therein to constitute a vivid natural scene as exists in the nature.

BRIEF SUMMARY OF THE INVENTION

In accordance with one aspect of the present invention, a decorative tank includes a main body, an air pump, an internal cap, and an external cap. The main body has a bed portion and a wall portion and defines a water reservoir therein. The wall portion of the main body has a substantially upright-sloping surface formed thereon. The bed portion has a substantially sloping surface which is declined toward the substantially upright-sloping surface of the wall portion to define a bottom portion of the water reservoir. The wall portion defines a passage therein which extends substantially upwardly from a lower end to an upper end. The passage is mounted with a three-way tube at the lower end to be in flow communication with the bottom portion of the water reservoir. The water reservoir contains a quantity of sand therein which has a specific weight greater than water. The wall portion of the main body is provided with a detachable transparent panel through which the view shown within the main body can be clearly seen from outside. The air pump is in flow communication with the three-way tube via a flexible hose for introducing air into the passage, so that sand can be carried upwardly together with water by air to flow along the passage and to finally exit from the upper end of the passage, to allow the sand to fall along the substantially upright-sloping surface of the wall portion of the main body to give the appearance of a waterfall. The air internal cap is detachably mounted with the wall portion of the main body above the upper end of the passage. The internal cap has a portion extending downwardly, and somewhat inwardly of the substantially upright-sloping surface, for guiding the sand which exits from the upper end of the passage to fall along the substantially upright-sloping surface, for guiding the sand which exit from the upper end of said passage to fall along the substantially upright-sloping surface in a smooth manner. The external cap is detachably mounted with the wall portion of the main body above the internal cap for covering the internal cap.

Other objects, advantages and novel features of the invention will become more apparent from the following detailed description when taken in conjunction with the accompanying drawings.

DETAIL DESCRIPTION OF THE PREFERRED EMBODIMENT

Figure 1:
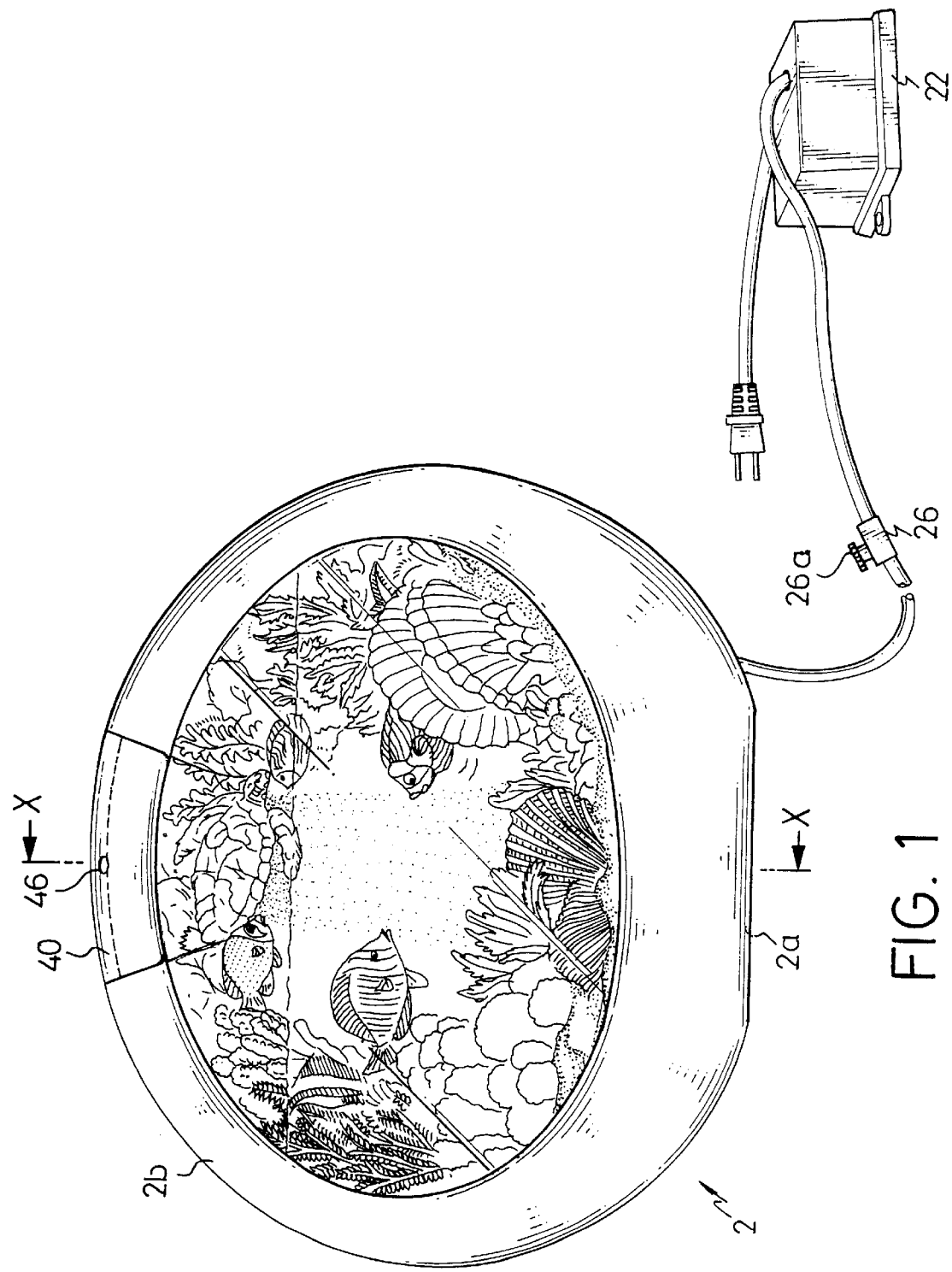
FIG. 1 is a front view of an embodiment in accordance with the present invention.
Figure 2:
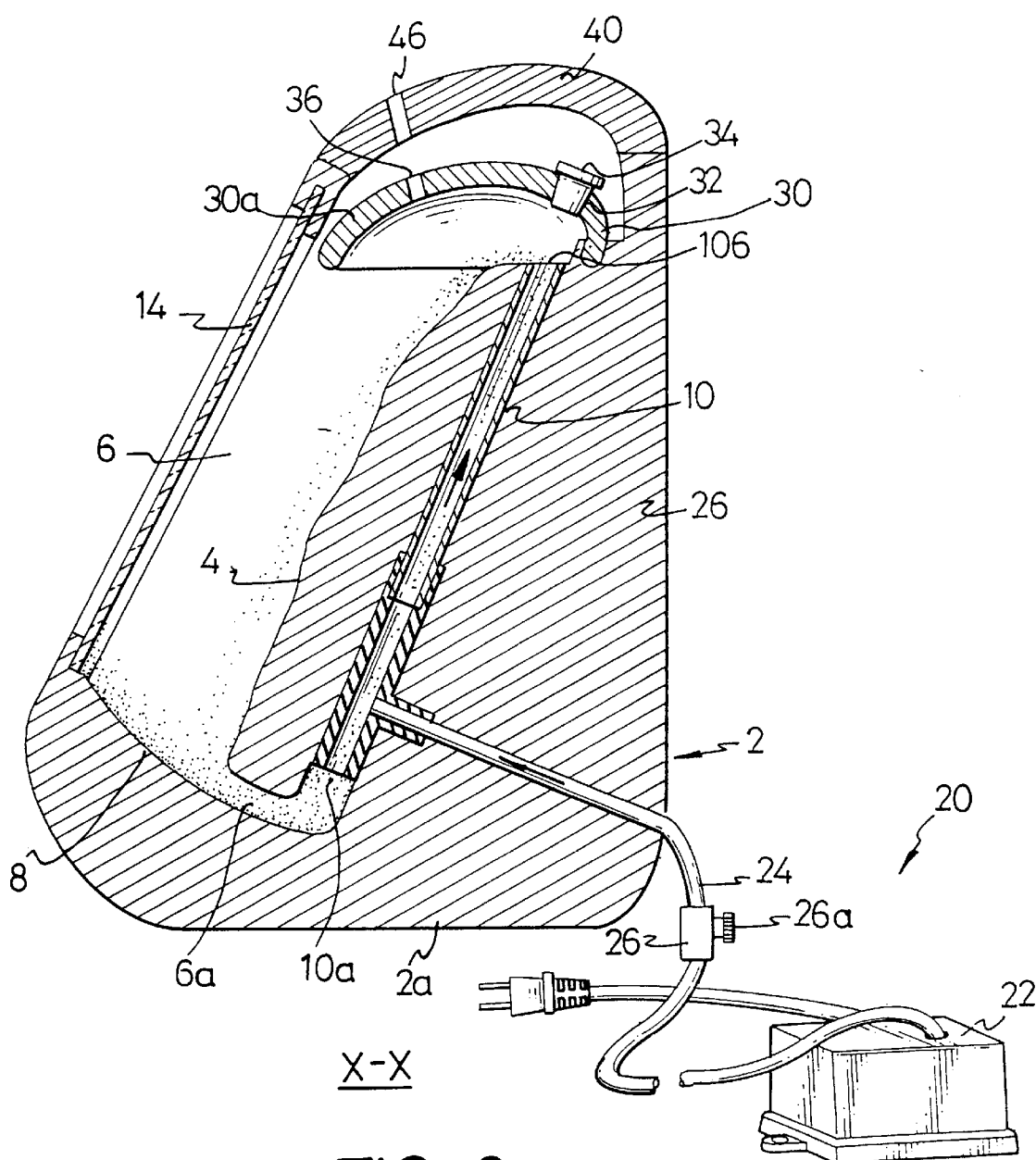
FIG. 2 shows mainly a cross-sectional view of the embodiment taken along X—X line of FIG. 1.
Figure 3:
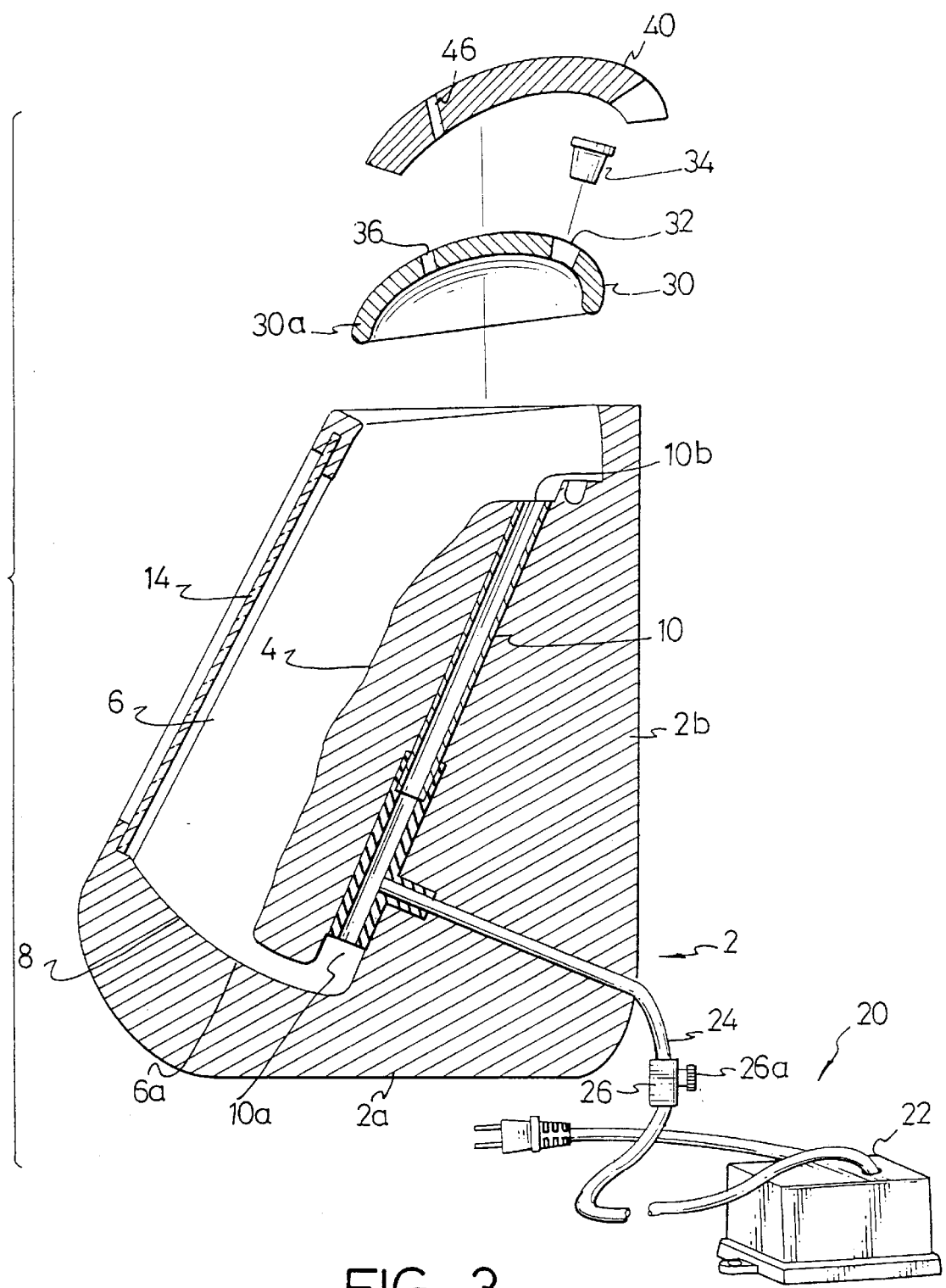
FIG. 3 shows a partially exploded cross-sectional view of the embodiment.

Referring first to FIGS. 1, 2 and 3, a typical embodiment of a decorative tank in accordance with the present invention comprises a main body 2, an air-introducing means 20, an internal cap 30, and an external cap 40. The main body 2, which has a bed portion 2a and a wall portion 2b, defines a water reservoir 6. The water reservoir 6 contains a quantity of particles therein which have a specific weight greater than water, such as natural sand.

The wall portion 2b of the main body 2 has a substantially upright-sloping surface 4 formed thereon. The bed portion 2a of the main body 2 has a substantially sloping surface 8 which is declined toward a bottom of the substantially upright-sloping surface 4 of the bed portion 2a to define a bottom portion 6a of the water reservoir 6 between the substantially upright-sloping surface 4 and the substantially sloping surface 8. As can be seen in FIG. 2, the substantially sloping surface 8 is configured for facilitating the sand to flow back to the bottom portion 6a of the water reservoir 6, as will become more apparent from a consideration of the following description.

Figure 6:
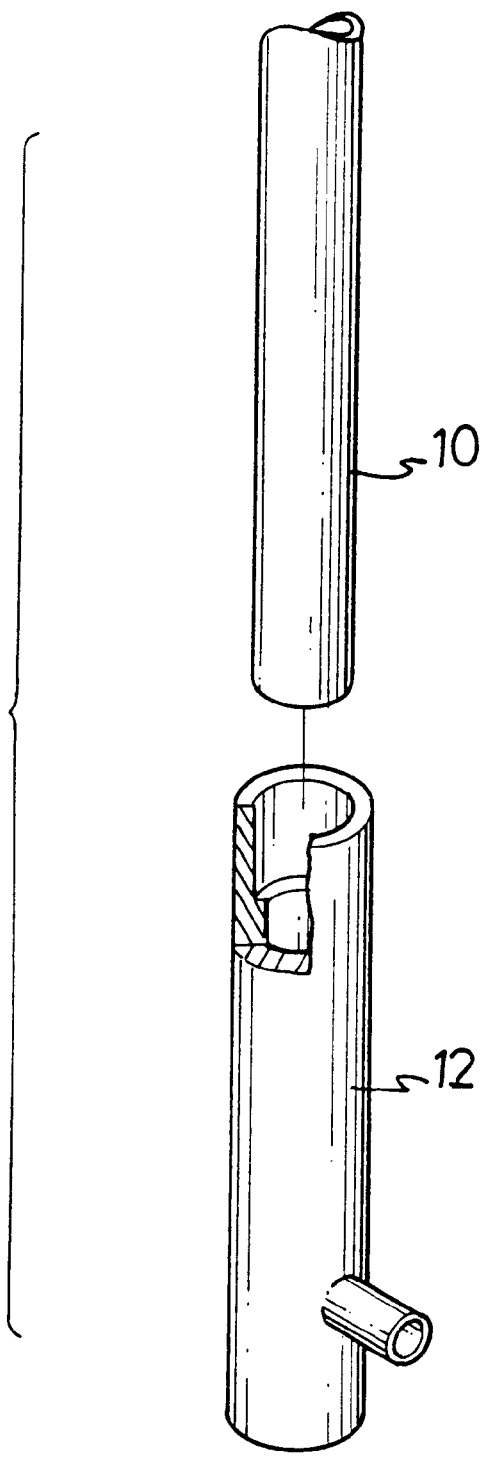
FIG. 6 shows a PVC tube and a three-way tube in accordance with the present invention.

The wall portion 2b of the main body 2 defines a passage 10 therein which extends substantially upwardly from a lower end 10a, at which the passage 10 communicates with the bottom portion 6a of the water reservoir 6, to an upper end 10b. As can be seen in FIGS. 2, 3 and 6, the passage 10 can be defined by a PVC tube, which is mounted with a three-way tube 12 at the lower end 10 a thereof to be in flow communication with the bottom portion 6a of the water reservoir 6 and the air-introducing means 20.

Referring to FIG. 2, the wall portion 2b of the main body 2 has a window portion through which the view within the main body can be clearly seen from outside. The window portion can be a separate transparent glass panel 14 which is detachably mounted with the wall portion 2b of the main body 2 at a position opposite to the substantially upright-sloping surface 4.

The air-introducing means 20 may comprise an air pump 22, a flexible hose 24, and an adjuster 26. The air pump 22 is in flow communication with the three-way tube 12 via the flexible hose 24 for introducing air into the lower end 10a of the passage 10. The adjuster 26 is mounted intermediate of the flexible hose 24 for controlling the air flow rate, so as to control the sand flow rate. Thus, the scale and pattern of the sand flow which exits from the upper end lob of the passage 10 can be adjusted by turning a knob 26a to control the air flow rate, as will become apparent from a consideration of the following description.

Referring to FIGS. 2 and 3, the internal cap 30 is detachably mounted with the wall portion 2a of the main body 2 above the upper end 10b of the passage 10. The internal cap 30 has a portion 30a extending downwardly, and somewhat inwardly of the substantially upright-sloping surface 4 for guiding the sand which exits from the upper end 10b of the passage 10 to fall in a smooth manner, as will become more apparent from a consideration of the following description. Furthermore, as shown in FIGS. 2 and 3, the internal cap 30 may be provided with an opening 32 which is defined at a position corresponding to the upper end 10b of the passage 10 and which is normally closed by a rubber plug 34, for facilitating a cleaning process with respect to the passage 10. Furthermore, the internal cap 30 may be provided with a vent 36 for facilitating removal of air from the tank. The external cap 40, which has a vent 46 and is detachably mounted with the wall portion 2a of the main body 2 above the internal cap 30, may be employed to cover the internal cap 30 for rendering the present invention in a neat and uniform style.

In use, when the air pump 22 introduces air to the three-way tube 12 or the lower end 10a of the passage 10, the air will flow upwardly along the passage 10 to exit from the upper end 10b of the passage 10. Since the atmospheric pressure at the three-way tube 12 or the lower end 10a of the passage 10 will be lower than that at the upper end 10b of the passage 10, the sand can be carried upwardly together with water by air to flow along the passage 10 and to finally exit from the upper end 10b of the passage 10 and then to be guided by the internal cap 30, to allow the sand to fall along the substantially upright-sloping surface 4 of the wall portion of the main body to give the appearance of a waterfall (see FIG. 2). Furthermore, the pattern and flow rate of the waterfall can be adjusted by turning the knob 26a of the adjuster 26.

Referring back to FIG. 1, the decorative tank can be provided with artificial contents such as corals, rocks, aquatic plants and animals therein for simulating a natural spectacle, accompanied by which the view shown in the tank will become more vivid, as a living scene in the nature.

Figure 4:
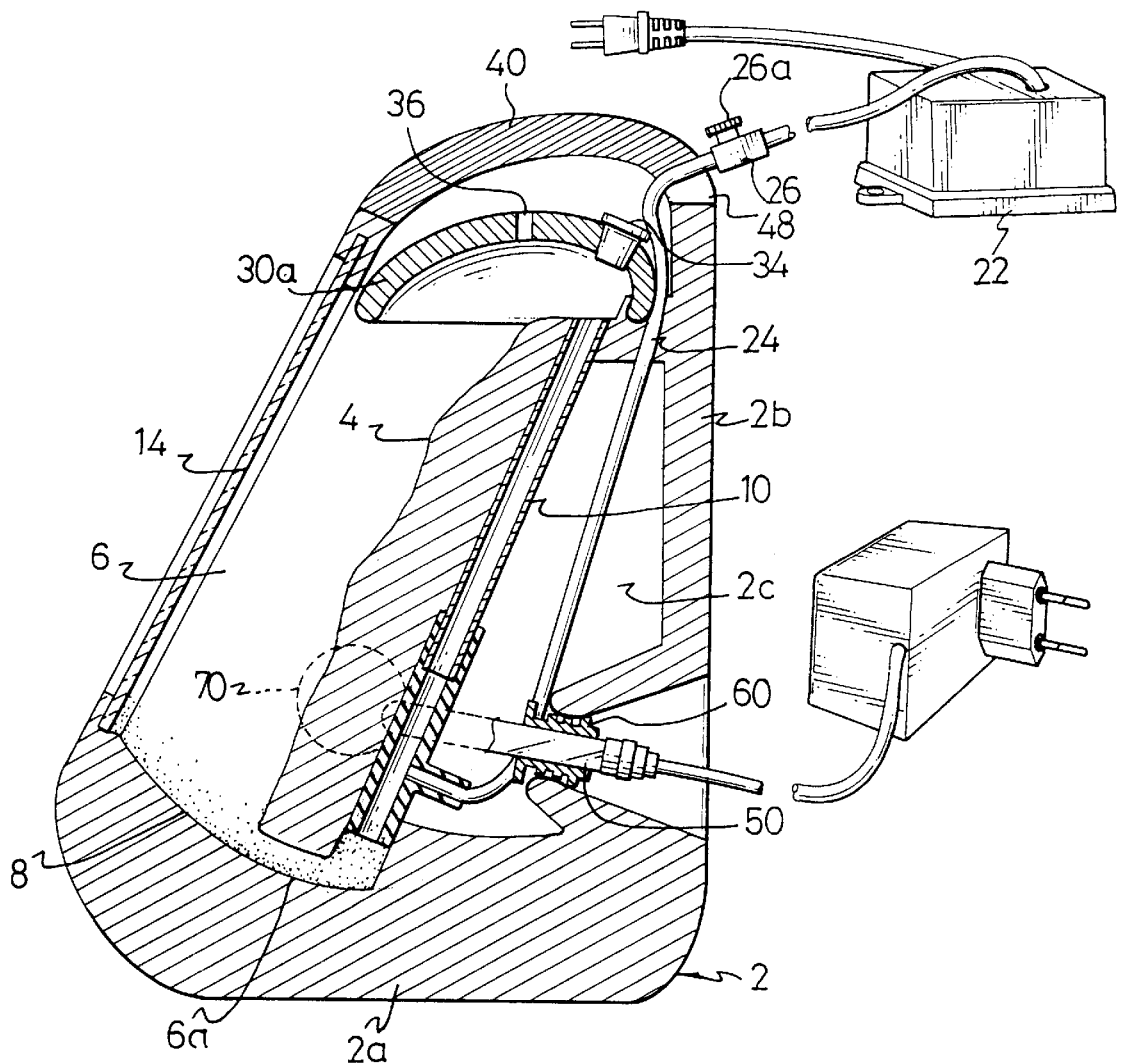
FIG. 4 is a locally modified embodiment in accordance with the present invention.
Figure 5:
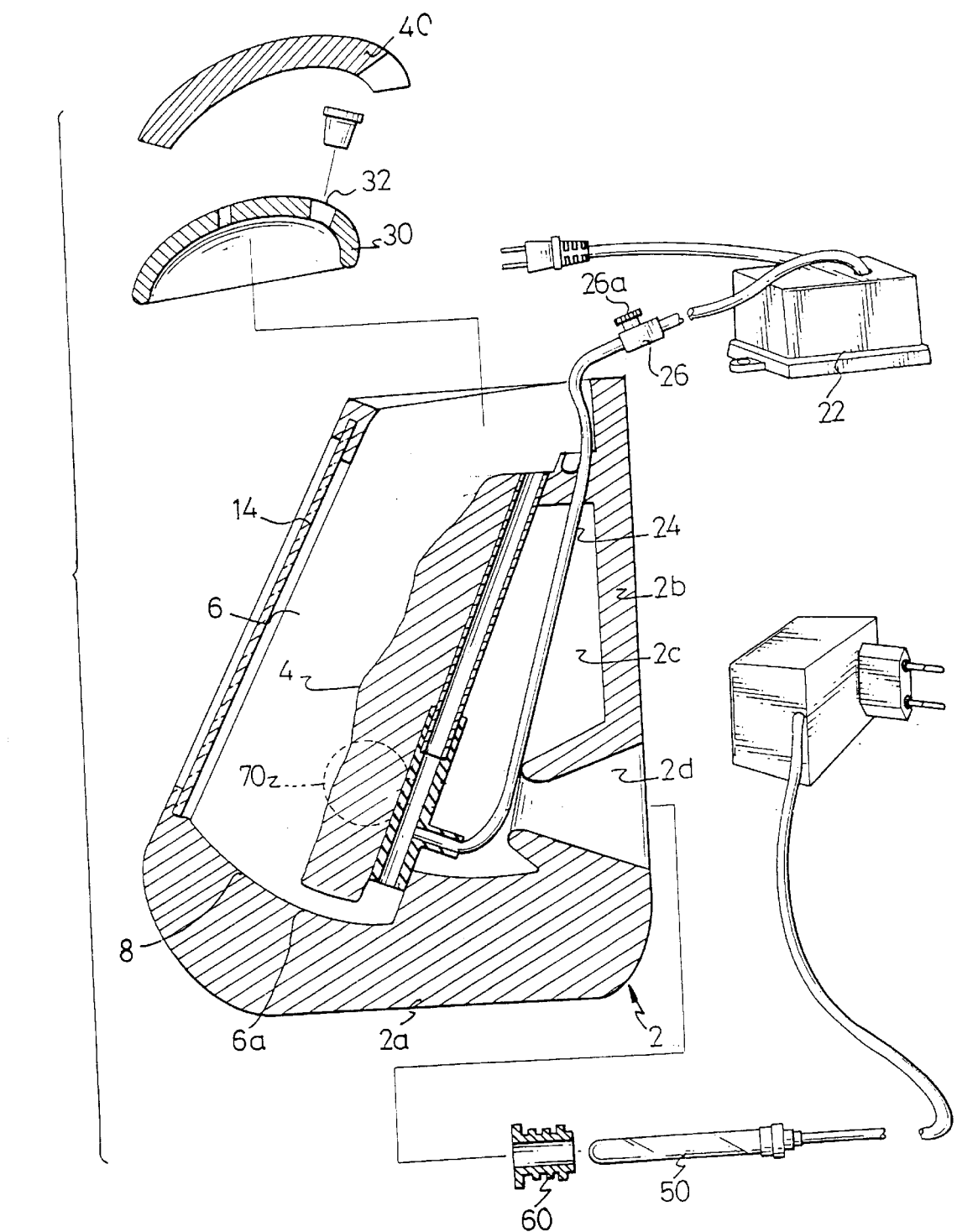
FIG. 5 shows a partially exploded cross-sectional view of the locally modified embodiment.

Referring to FIGS. 4 and 5, a locally modified embodiment in accordance with the present invention is as shown. There is a space 2c defined within the wall portion 2b of the main body 2 to accommodate the aforementioned passage 10, the three-way tube 12, the flexible hose 24, and a water-proof lamp 50 which is inserted in a lower portion of the space 2c and extendable to the water reservoir 6 via a hole 2d which is defined in the wall portion 2a of the main body 2 in communication with the space 2c. The water-proof lamp 50 is disposed for lighting up the water reservoir 6, which will become more apparent from a consideration of the following description. As shown in FIGS. 4 and 5, the flexible hose 24 can be extended through an opening 48 to arrive at the three-way tube 12. The opening is defined by the external cap 40 and a top portion of the wall portion 2b and has a dimension greater than the flexible hose 24 to define an air vent thereof for facilitating removal of air from the tank.

As shown in FIGS. 4 and 5, the lamp 50 is sleeved by a sealing plug 60 which is employed for sealing engagement of the hole 2c defined in the wall portion 2a of the main body 2 for the purpose of water-proofing. Furthermore, a transparent glass ball shell 70, being configured like a pearl, can be provided in the reservoir 6 before the lamp 50. In such an arrangement, the transparent glass ball shell 70 can be lit up by the lamp 50 to transmit light onto its surrounding objects (such as the corals, rocks, aquatic plants and animals) in the water reservoir 6 to render the view within the tank brighter and more colorful.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A decorative tank comprising:
    a main body having a bed portion and a wall portion, said main body defining a water reservoir, said wall portion of said main body having a substantially upright-sloping surface formed thereon, said wall portion defining a passage therein which extends substantially upwardly from a lower end to an upper end, said passage communicating with a bottom portion of said water reservoir at said lower end, said water reservoir containing a quantity of particles therein which have a specific weight greater than water, said wall portion of said main body having a window portion through which a view within said main body can be clearly seen from outside; and
    means for introducing air into said lower end of said passage, so that sand can be carried upwardly together with water to flow along said passage and to finally exit from said upper end of said passage, to allow said sand to fall along said substantially upright-sloping surface to give the appearance of a waterfall.

2. A decorative tank as claimed in claim 1, wherein said bed portion of said main body has a substantially sloping surface which is declined toward said substantially upright-sloping surface of said wall portion for facilitating the sand which exits from said upper end of said passage to flow back to said bottom portion of said water reservoir.

3. A decorative tank as claimed in claim 2, further comprising an internal cap detachably mounted with said wall portion of said main body above said passage, said internal cap having a portion extending downwardly, and somewhat inwardly of said substantially upright-sloping surface, for guiding the sand which exits from said upper end of said passage to fall along said substantially upright-sloping surface of said wall portion of said main body in a smooth manner.

4. A decorative tank as claimed in claim 3, wherein said internal cap has an opening which is defined at a position corresponding to said second end of said passage and which is normally closed by a rubber plug, for facilitating a cleaning process with respect to said passage.

5. A decorative tank as claimed in claim 4, wherein said internal cap is provided with a vent for facilitating removal of air from said tank.

6. A decorative tank as claimed in claim 5, further comprising an external cap with a vent detachably mounted with said wall portion of said main body above said internal cap for covering said internal cap.

7. A decorative tank as claimed in claim 1, wherein said window portion is a separate transparent panel which is detachedly mounted with said wall portion of said main body at a position opposite to said substantially upright-sloping surface.

8. A decorative tank as claimed in claim 7, wherein said air-introducing means comprises an air pump which is in flow communication with said lower end of said passage via a flexible hose.

9. A decorative tank as claimed in claim 8, wherein said flexible hose is in flow communication with said passage via a three-way tube which is in flow communication with said passage and said bottom portion of said water reservoir.

10. A decorative tank as claimed in claim 9, wherein said air-introducing means further comprises an adjuster mounted on an intermediate portion of said flexible hose for controlling air flow rate.

11. A decorative tank as claimed in claim 10, further comprising a lamp disposed at a lower portion of said wall portion of said main body and being extendable to said water reservoir for lighting up said water reservoir.

12. A decorative tank comprising:
    a main body having a bed portion and a wall portion, said main body defining a water reservoir, said wall portion of said main body having a substantially upright-sloping surface formed thereon, said bed portion having a substantially sloping surface which is declined toward said substantially upright-sloping surface of said wall portion to form a bottom portion of said water reservoir, said wall portion defining a space in which a passage tube is mounted, said passage tube extending substantially upwardly from a lower end to an upper end, said passage tube being mounted with a three-way tube at said lower end to be in flow communication with said bottom portion of said water reservoir, said water reservoir containing a quantity of sand which has a specific weight greater than water, said wall portion of said main body being provided with a transparent panel through which a view within said main body can be clearly seen from outside;

an air pump in flow communication with said three-way tube via a flexible hose for introducing air into said passage tube, so that said sand can be carried upwardly together with water by said air to flow along said passage tube and to finally exit from said upper end of said passage tube, to allow said sand to fall along said substantially upright-sloping surface to give the appearance of a waterfall; and a lamp mounted in a lower portion of said space defined in said wall portion of said main body and being extendable to said water reservoir for lighting up said water reservoir.

13. A decorative tank as claimed in claim 12, further comprising an internal cap detachably mounted with said wall portion of said main body above said upper end of said passage tube, said internal cap having a portion extending downwardly, and somewhat inwardly of said substantially upright-sloping surface for guiding the sand which exits from said upper end of said passage to fall along said substantially upright-sloping surface of said wall portion of said main body in a smooth manner.

14. A decorative tank as claimed in claim 13, further comprising an external cap detachably mounted with said wall portion of said main body above said internal cap for covering said internal cap.

15. A decorative tank as claimed in claim 14, further comprising an adjuster mounted on an intermediate portion of said flexible hose for controlling air flow rate.

\* \* \* \* \*